(12) United States Patent
Kierspe et al.

(10) Patent No.: US 9,636,818 B2
(45) Date of Patent: *May 2, 2017

(54) MULTI-SPEED CYCLOIDAL TRANSMISSION

(71) Applicant: Techtronic Power Tools Technology Limited, Tortola (VG)

(72) Inventors: Addison C. Kierspe, Moncks Corner, SC (US); Kyle D. Turner, Lexington, SC (US); Kirton W. Neipp, Mt. Pleasant, SC (US); Leonid D. Kapanzhi, Campobello, SC (US); William C. Buck, Clemson, SC (US)

(73) Assignee: TECHTRONIC POWER TOOLS TECHNOLOGY LIMITED, Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 14/926,776

(22) Filed: Oct. 29, 2015

(65) Prior Publication Data

US 2016/0046012 A1  Feb. 18, 2016

Related U.S. Application Data

(63) Continuation of application No. 14/087,180, filed on Nov. 22, 2013, now Pat. No. 9,217,492.

(51) Int. Cl.
*F16H 3/70* (2006.01)
*B25F 5/00* (2006.01)
*F16H 3/46* (2006.01)

(52) U.S. Cl.
CPC .............. *B25F 5/001* (2013.01); *F16H 3/46* (2013.01); *F16H 3/70* (2013.01); *F16H 2200/0034* (2013.01); *F16H 2200/0039* (2013.01); *F16H 2200/2007* (2013.01)

(58) Field of Classification Search
None
See application file for complete search history.

(56) References Cited

U.S. PATENT DOCUMENTS

| 4,177,695 | A | 12/1979 | Grove |
| 4,484,489 | A | 11/1984 | Boutant |
| 4,760,759 | A | 8/1988 | Blake |
| 5,044,643 | A | 9/1991 | Nakamura |

(Continued)

FOREIGN PATENT DOCUMENTS

| EP | 0063725 | 11/1982 |
| EP | 1364752 | 2/2010 |
| WO | 2011098923 | 8/2011 |

OTHER PUBLICATIONS

European Patent Search Report for Application No. 14190101.7 dated Apr. 7, 2015 (4 pages).

*Primary Examiner* — Dirk Wright
(74) *Attorney, Agent, or Firm* — Michael Best & Friedrich LLP

(57) ABSTRACT

A transmission assembly for operably coupling an input member to an output member includes a first cycloidal gear stage having a first gear ratio and a second cycloidal gear stage having a second gear ratio different than the first gear ratio. The transmission assembly also includes a shifting mechanism for selectively driving the output member with one of the first cycloidal gear stage and the second cycloidal gear stage.

26 Claims, 7 Drawing Sheets

(56) References Cited

U.S. PATENT DOCUMENTS

| | | | |
|---|---|---|---|
| 5,167,095 A | 12/1992 | Berger | |
| 5,172,923 A | 12/1992 | Nakamura | |
| 5,261,679 A | 11/1993 | Nakamura | |
| 5,322,303 A | 6/1994 | Nakamura | |
| 5,549,507 A | 8/1996 | Schroeder et al. | |
| 5,692,575 A | 12/1997 | Hellstrom | |
| 5,916,014 A | 6/1999 | Schroeder et al. | |
| 6,102,787 A | 8/2000 | Schroeder et al. | |
| 6,342,023 B1 | 1/2002 | Willmot | |
| 6,796,921 B1 | 9/2004 | Buck et al. | |
| 7,101,300 B2 | 9/2006 | Milbourn et al. | |
| 7,404,781 B2 | 7/2008 | Milbourne et al. | |
| 7,644,783 B2 | 1/2010 | Roberts et al. | |
| 8,197,379 B1 | 6/2012 | Yin | |
| 8,251,158 B2 | 8/2012 | Tomayko et al. | |
| 8,276,430 B2 | 10/2012 | Barezzani et al. | |
| 8,506,438 B2 | 8/2013 | Makino | |
| 8,708,861 B2 | 4/2014 | Inagaki et al. | |
| 9,217,492 B2 * | 12/2015 | Kierspe | B25F 5/001 |
| 2004/0097325 A1 | 5/2004 | Kolstrup | |
| 2005/0049102 A1 | 3/2005 | Hsieh | |
| 2009/0200830 A1 | 8/2009 | Paton et al. | |
| 2010/0031935 A1 | 2/2010 | VanDyne et al. | |
| 2010/0048342 A1 | 2/2010 | Chadwick | |
| 2010/0267508 A1 | 10/2010 | Hvolka et al. | |
| 2011/0245030 A1 | 10/2011 | Wakida et al. | |
| 2013/0157795 A1 | 6/2013 | Misada et al. | |
| 2013/0161041 A1 | 6/2013 | Junkers et al. | |
| 2013/0210568 A1 | 8/2013 | Sato et al. | |
| 2014/0024489 A1 | 1/2014 | Heber et al. | |
| 2014/0349800 A1 | 11/2014 | Correa Cely et al. | |
| 2015/0053448 A1 | 2/2015 | Busschaert et al. | |

* cited by examiner

MULTI-SPEED CYCLOIDAL TRANSMISSION

CROSS-REFERENCE TO RELATED APPLICATIONS

This application is a continuation of co-pending U.S. patent application Ser. No. 14/087,180 filed on Nov. 22, 2013, the entire content of which is incorporated herein by reference.

FIELD OF THE INVENTION

The present invention relates to power tools, and more particularly to power tool transmissions.

BACKGROUND OF THE INVENTION

Tasks typically performed by drills (e.g., drilling and screw driving) generally require a low amount of torque at the initial stage of the task and a higher amount torque at the final stage of the task. Some power tool transmissions are user-configurable to provide different speed outputs of the power tool. For example, an operator of a multi-speed drill may configure the drill for high-speed operation or low-speed operation by actuating a switch on the drill.

SUMMARY OF THE INVENTION

The invention provides, in one aspect, a transmission assembly for operably coupling an input member to an output member. The transmission assembly includes a first cycloidal gear stage having a first gear ratio and a second cycloidal gear stage having a second gear ratio different than the first gear ratio. The transmission assembly also includes a shifting mechanism for selectively driving the output member with one of the first cycloidal gear stage and the second cycloidal gear stage.

The present invention provides, in another aspect, a power tool including a motor, a spindle configured to be driven by the motor, and a transmission assembly. The transmission assembly includes an input member for receiving torque from the motor and an output member for transmitting torque to the spindle. The transmission assembly also includes a first cycloidal gear stage having a first gear ratio, a second cycloidal gear stage having a second gear ratio different than the first gear ratio, and a shifting mechanism for selectively driving the output member with one of the first cycloidal gear stage and the second cycloidal gear stage.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
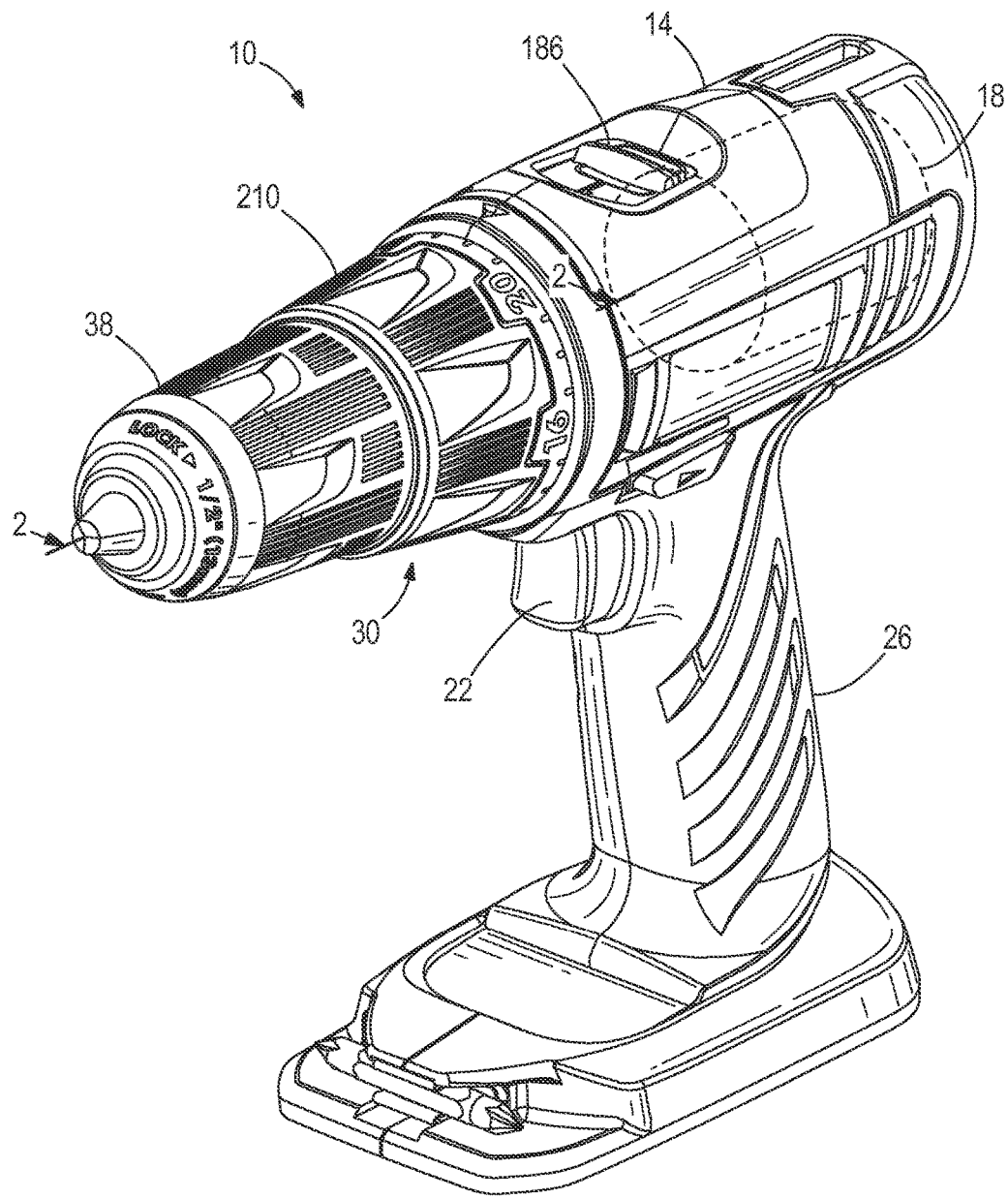
FIG. 1 is a perspective view of an exemplary embodiment of a power tool.

FIG. 1 illustrates a power tool 10 including a housing 14 and a motor 18 disposed within the housing 14. In the illustrated embodiment of the power tool 10, the motor 18 is configured as a DC motor that receives power from an on-board power source (e.g., a battery, not shown). The battery may include any of a number of different nominal voltages (e.g., 12V, 18V, etc.), and may be configured having any of a number of different chemistries (e.g., lithium-ion, nickel-cadmium, etc.). Alternatively, the motor 18 may be powered by a remote power source (e.g., a household electrical outlet) through a power cord. The motor 18 is selectively activated by depressing a trigger 22 located on a handle portion 26 of the housing 14. The trigger 22 may actuate a switch that is electrically connected to the motor 18 via a top-level or master controller, or one or more circuits, for controlling operation of the motor 18.

Figure 2:
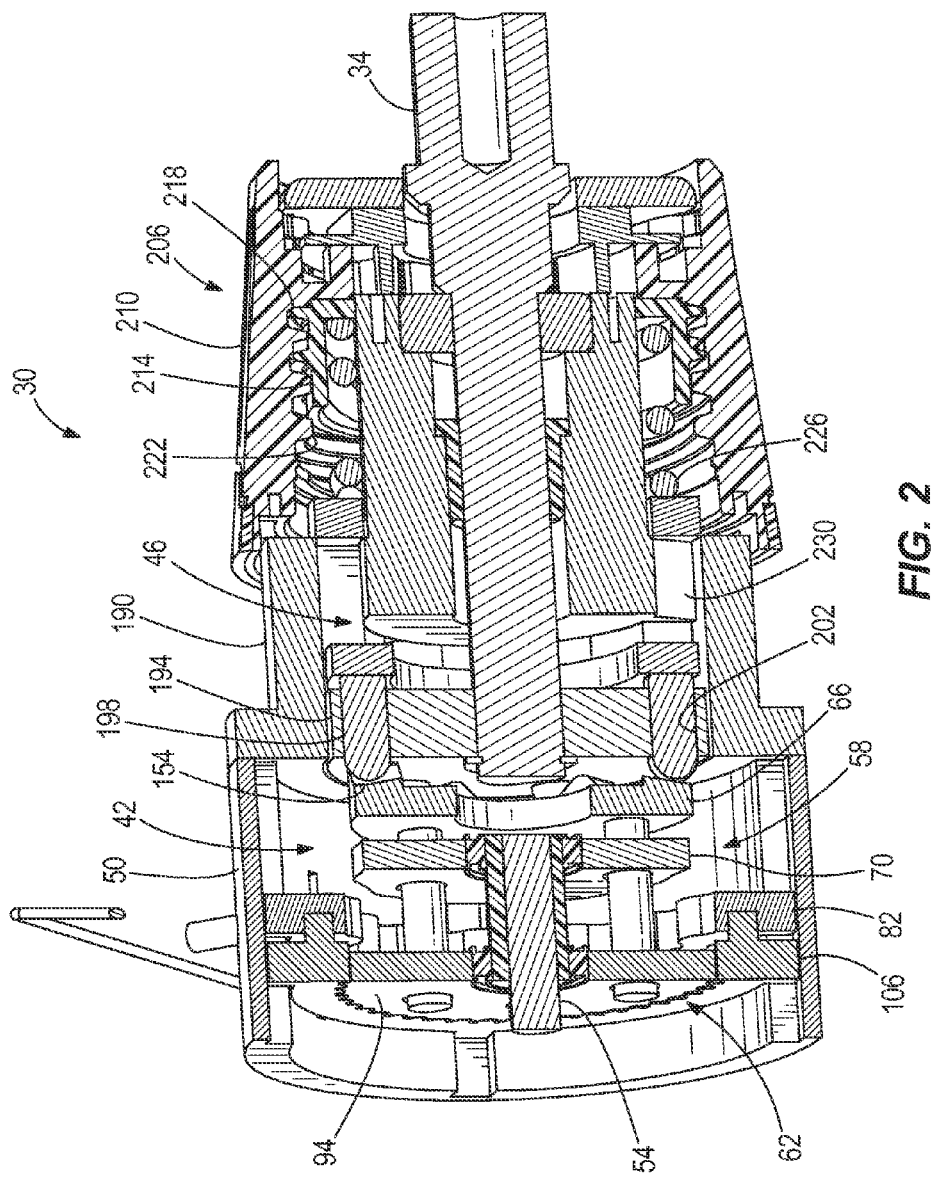
FIG. 2 is a cross-sectional view of a front end assembly of the power tool, taken through line 2-2 of FIG. 1, including a transmission assembly according to an embodiment of the invention.

FIG. 2 illustrates a front end assembly 30 of the power tool 10 of FIG. 1, including a spindle 34 that can be coupled to a conventional tool chuck 38 (FIG. 1) for securing a tool bit (not shown) thereto. In other embodiments, the spindle 34 may be coupled to other types of chucks, bit retainers, and the like. The front end assembly 30 further includes a transmission assembly 42 for operably coupling the motor 18 to the spindle 34. An adjustable clutch mechanism 46 is also used in conjunction with the transmission assembly 42 to selectively limit the amount of torque that may be transferred from the transmission 42 to the spindle 34. However, the transmission 42 need not be used in conjunction with the adjustable clutch mechanism 46.

With continued reference to FIG. 2, the transmission assembly 42 includes a transmission housing 50, an input shaft 54 that receives torque from the motor 18, a first cycloidal gear stage 58 having a first gear ratio R1, a second cycloidal gear stage 62 having a second gear ratio R2, and an output member 66 that transfers torque to spindle 34 via the clutch mechanism 46.

Figure 3:
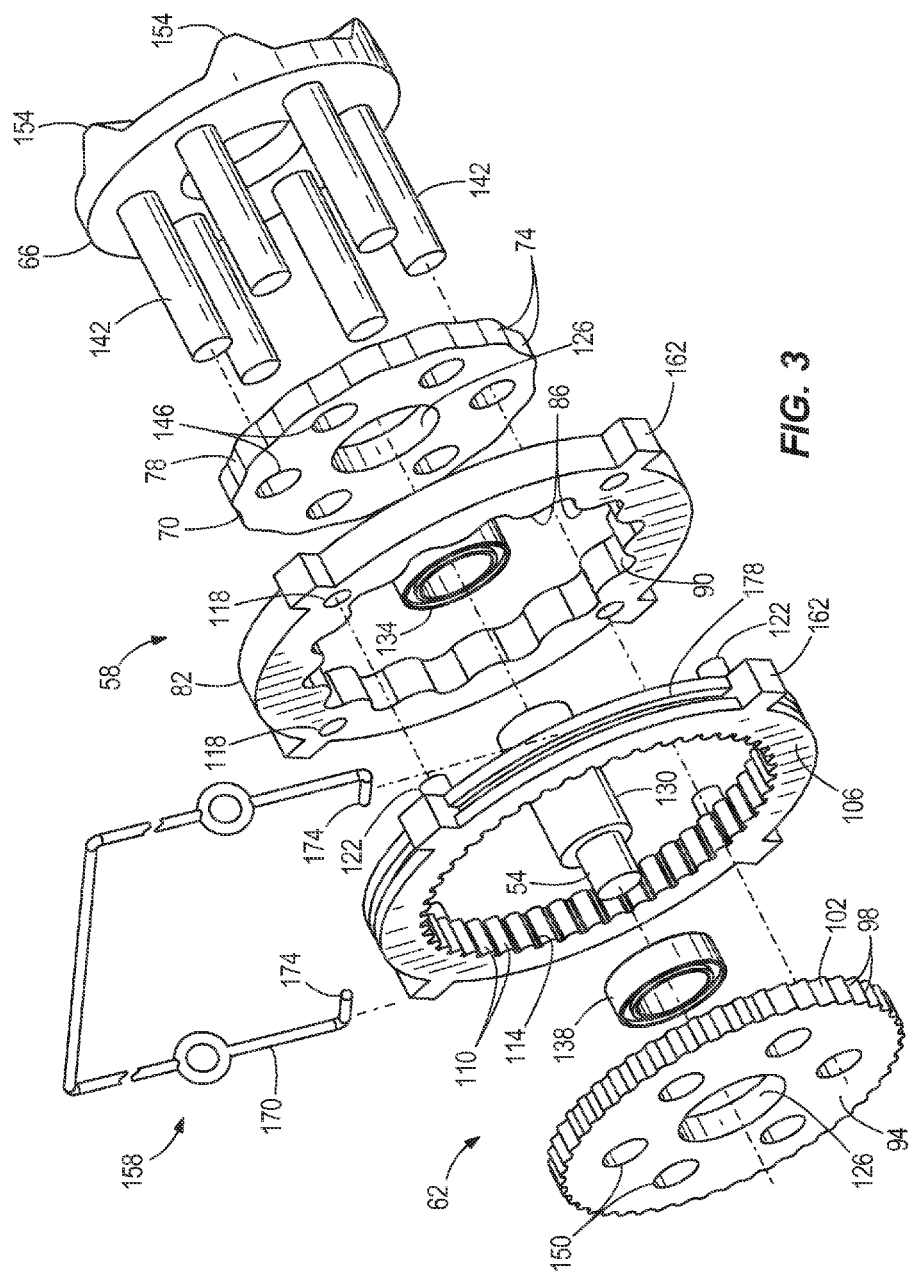
FIG. 3 is an exploded view of the transmission assembly of FIG. 2.

With reference to FIG. 3, the first gear stage 58 includes a first disc 70 having a plurality of rounded teeth 74 on an outer circumferential surface 78 of the first disc 70. The first gear stage 58 further includes a first ring gear 82 having a plurality of rounded teeth 86 on an inner circumferential surface 90 of the ring gear 82 that are selectively engageable with the teeth 74 of the first disc 70. Similarly, the second gear stage 62 includes a second disc 94 having a plurality of rounded teeth 98 on an outer circumferential surface 102 of the second disc 94. The second gear stage 62 also includes a second ring gear 106 having a plurality of rounded teeth 110 on an inner circumferential surface 114 of the ring gear 106 that are selectively engageable with the teeth 98 of the second disc 94. As described in further detail below, the ring gears 82, 106 are axially movable relative to the transmission housing 50 and the discs 70, 94. The first ring gear 82 includes a plurality of bores 118 that receive a corresponding plurality of posts 122 projecting from the second ring gear 106 to couple the first and second ring gears 82, 106 (e.g., using an interference fit). As such, the ring gears 82, 106 are axially movable together in unison. In other embodiments, the ring gears 82, 106 may be coupled in any other suitable manner or may be integrally formed as a single piece. Alternatively, the ring gears 82, 106 may be axially movable independently of one another.

Each of the first and second discs 70, 94 includes a central bore 126 that receives an eccentric cam portion 130 of the input shaft 54. Bearings 134, 138 are disposed between the respective discs 70, 94 and the eccentric cam portion 130 to axially fix the discs 70, 94 to the eccentric cam portion 130 while permitting rotation of the discs 70, 94 relative to the eccentric cam portion 130. As the input shaft 54 rotates, the eccentric cam portion 130 concurrently drives both of the discs 70, 94 by imparting cycloidal or wobbling motion to the discs 70, 94. When the first disc 70 is engaged with the first ring gear 82, cycloidal engagement of the teeth 74, 86 causes the first disc 70 to rotate about the bearing 134 in a direction opposite the rotational direction of the input shaft 54. When the second disc 94 is engaged with the second ring gear 106, cycloidal engagement of the teeth 98, 110 causes the second disc 94 to rotate about the bearing 138 in a direction opposite the rotational direction of the input shaft 54.

With continued reference to FIG. 3, the output member 66 includes a plurality of axially extending pins 142 offset from a rotational axis of the output member 66. The pins 142 are received within corresponding offset holes 146, 150 in the respective discs 70, 94. As the discs 70, 94 rotate, the sides of the holes 146, 150 engage the pins 142 to drive the output member 66. The holes 146, 150 have a diameter greater than a diameter of the pins 142 in order to convert the cycloidal or wobbling motion of the discs 70, 94 into smooth, concentric rotation of the output member 66. For example, the holes 146, 150 may have a diameter approximately equal to the diameter of the pins 142 plus twice the eccentric offset of the eccentric cam portion 130.

In some embodiments, the eccentric cam portion 130 may include two distinct cam sections offset from input shaft 54 in opposite directions. Each of these cam sections may be received by a respective one of the first and second discs 70, 94. As such, the first and second discs 70, 94 may counterbalance each other to reduce vibration generated by the cycloidal or wobbling motion of the discs 70, 94. Each of the cam sections may also have a different eccentric offset. Accordingly, the holes 146, 150 may have different diameters and the pins 142 may be stepped to include a first diameter and a second diameter in order to accommodate the different eccentric offsets of the cam sections.

The output member 66 further includes a plurality of clutch dogs 154 opposite the pins 142. The clutch dogs 154 provide torque input to the clutch mechanism 46, as described in greater detail below. Alternatively, the output member 66 may be directly attached to the spindle 34, or may provide a torque input to another speed-reducing stage, which could include a cycloidal arrangement, a planetary arrangement, etc.

The transmission assembly 42 includes a shifting mechanism 158 operable to move the first and second ring gears 82, 106 between a first position (FIG. 4) and a second position (FIG. 6) relative to the transmission housing 50. In the first position, the first ring gear 82 is axially aligned with the first disc 70 for enabling the first gear stage 58, and the second ring gear 106 is axially spaced from the second disc 94 for disabling the second gear stage 62. In the second position, the second ring gear 106 is axially aligned with the second disc 94 for enabling the second gear stage 62, and the first ring gear 82 is axially spaced from the first disc 70 for disabling the first gear stage 58. The first and second ring gears 82, 106 each include a plurality of projections 162 or keys received in corresponding slots 166 or keyways in the transmission housing 50 to permit sliding movement of the ring gears 82, 106 between the first and second positions while preventing rotation of the ring gears 82, 106 relative to the transmission housing 50.

Figure 4:
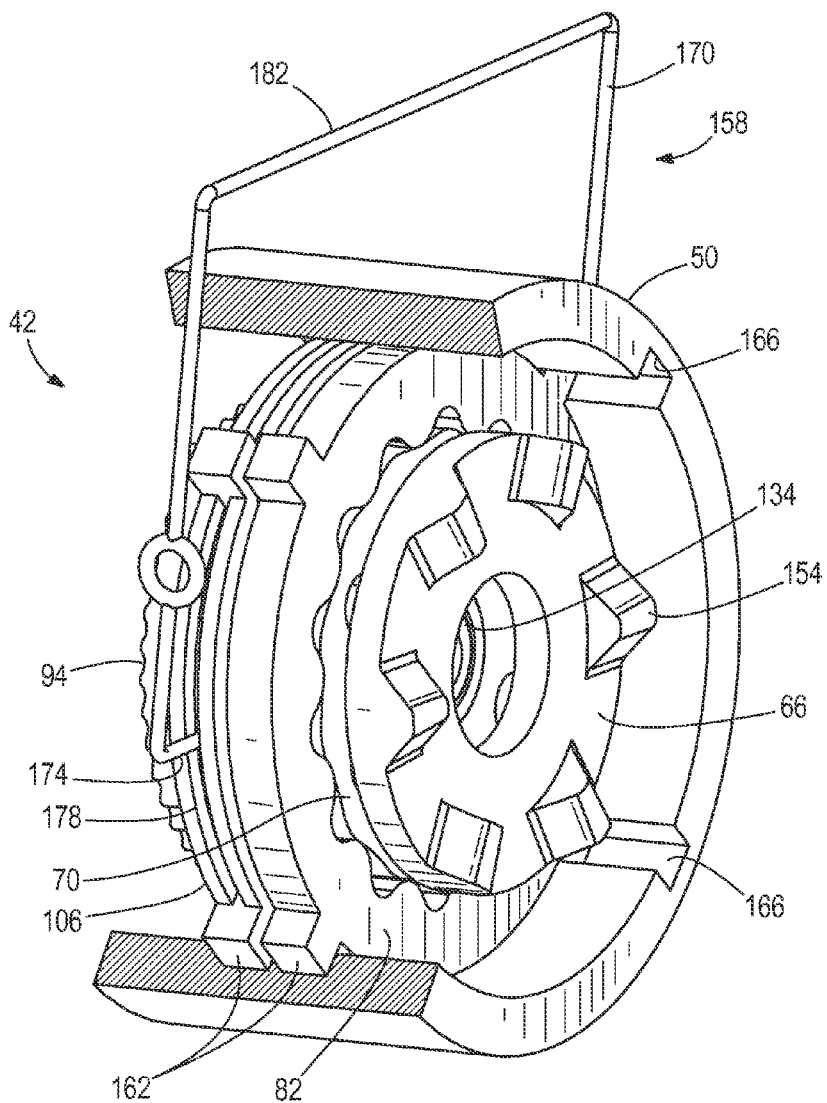
FIG. 4 is a perspective view of the transmission assembly of FIG. 2 in a high speed, low torque mode.
Figure 6:
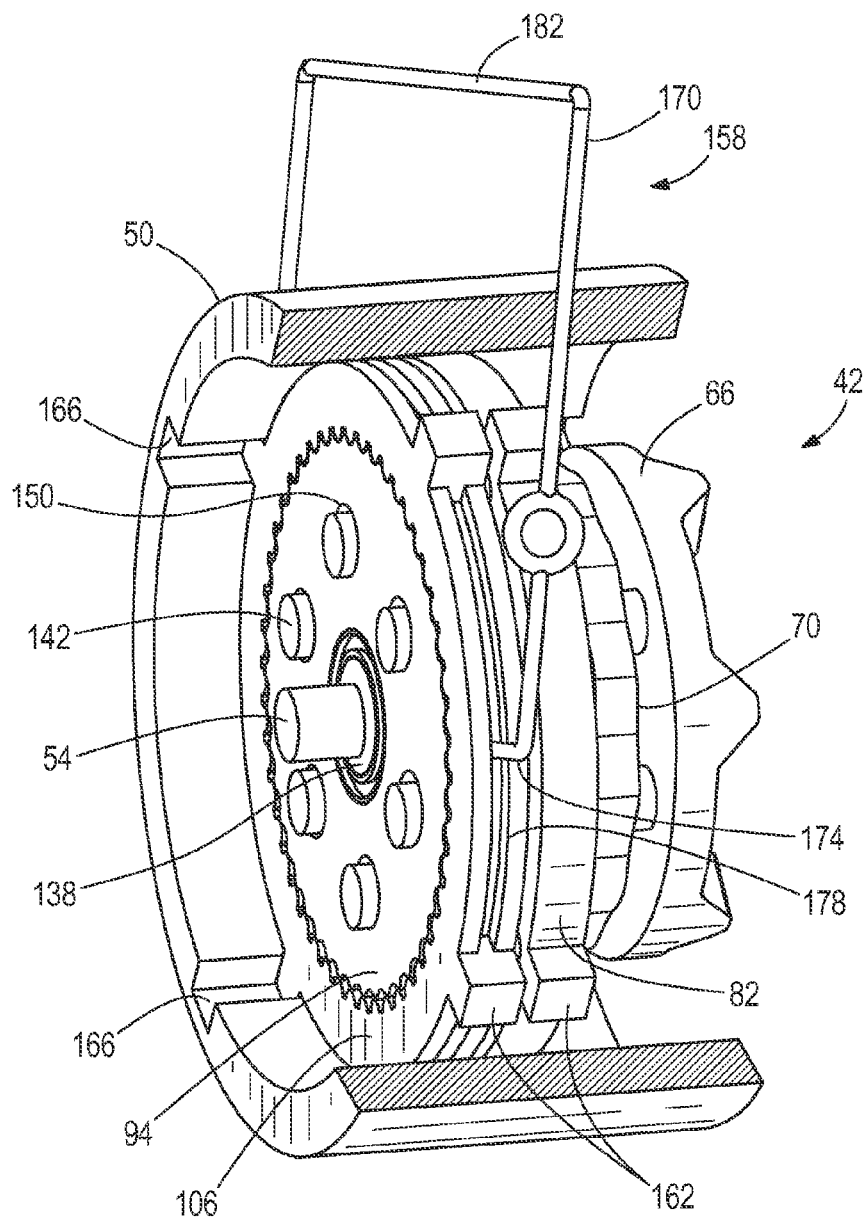
FIG. 6 is a perspective view of the transmission assembly of FIG. 2 in a low speed, high torque mode.

With continued reference to FIGS. 4 and 6, the shifting mechanism 158 includes a speed change lever 170 pivotally mounted to the transmission housing 50 and having distal ends 174 received within a circumferential slot 178 of the second ring gear 106. The speed change lever 170 is pivotable to shift the ring gears 82, 106 between the first and second positions shown in FIGS. 4 and 6, respectively, for selectively engaging the ring gears 82, 106 with the associated discs 70, 94. A proximal end 182 of the speed change lever 170 interfaces with a sliding actuator 186 (FIG. 1) disposed on top of the housing 14 of the power tool 10 such that a user may manipulate the sliding actuator 186 to actuate the speed change lever 170. In other embodiments, the shifting mechanism 158 may be configured in any of a number of different ways for displacing the first and second ring gears 82, 106 between the first and second positions.

Alternatively, the ring gears 82, 106 may be axially fixed within the transmission housing 50 and rotatable relative to the housing 50. In such embodiments, the shifting mechanism 158 may include a collar or other structure operable to selectively lock the first and second ring gears 82, 106 to the housing 50. For example, the first ring gear 82 may be locked against rotation for enabling the first gear stage 58, and the second ring gear 106 may be free to rotate within the housing for disabling the second gear stage 62. Conversely, the second ring gear 106 may be locked against rotation for enabling the second gear stage 62, and the first ring gear 82 may be free to rotate within the housing for disabling the first gear stage 58.

Figure 5:
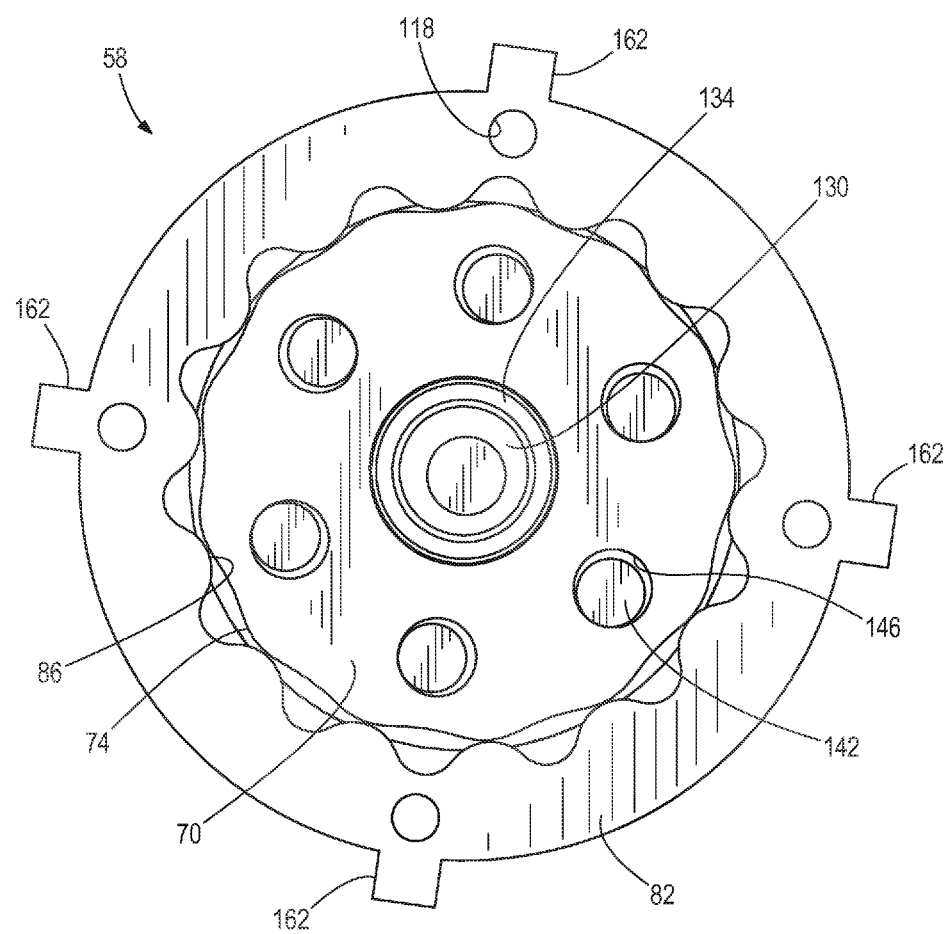
FIG. 5 is a plan view of a first cycloidal gear stage of the transmission assembly of FIG. 2, including a first ring gear and a first disc.
Figure 7:
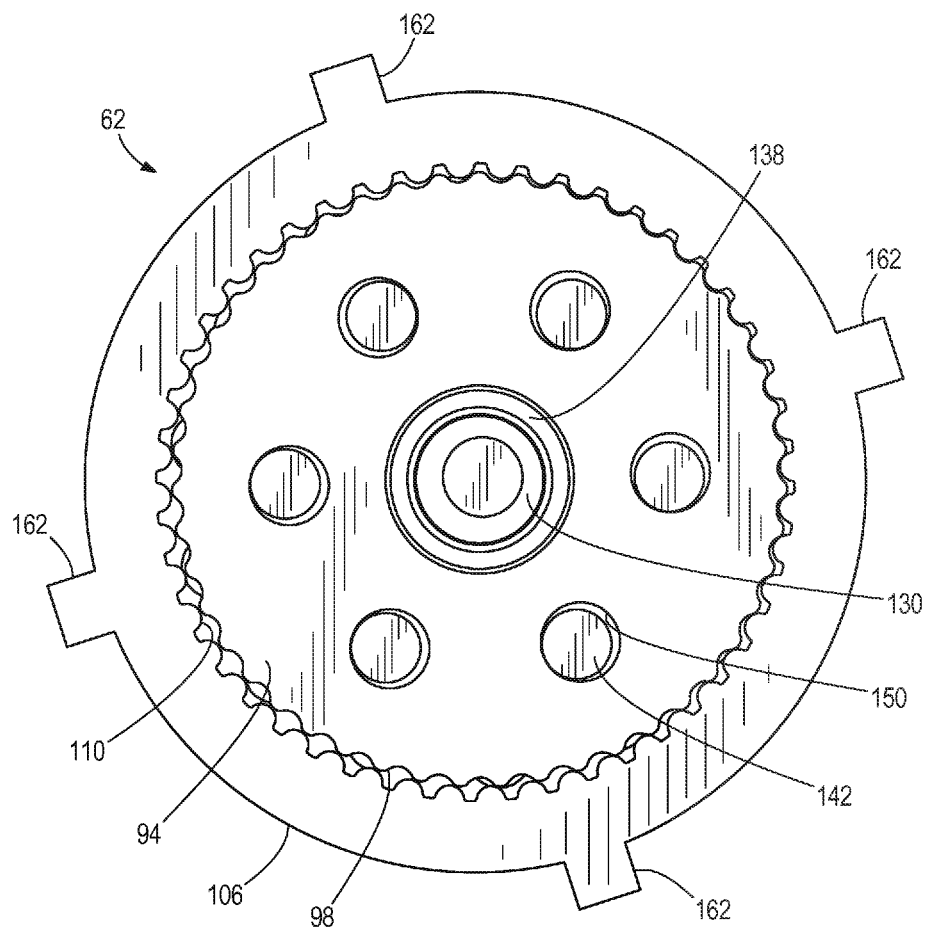
FIG. 7 is a plan view of a second cycloidal gear stage of the transmission assembly of FIG. 2, including a second ring gear and a second disc.

With reference to FIGS. 5 and 7, the ring gears 82, 106 each include a number of teeth N1, N2, and the discs 70, 94 each include a number of teeth M1, M2, equal to one less than the number of teeth N1, N2, of their associated ring gears 82, 106 (i.e., M1=N1−1 and M2=N2−1). Although the ring gears 82, 106 are illustrated herein as having generally similar inner and outer diameters, the inner and/or outer diameter of each ring gear 82, 106 may vary (e.g., to change the size and number of teeth 86, 110).

When the ring gears 82, 106 are in the first position (FIG. 5), the first gear stage 58 provides a reduction ratio R1 governed by the following equation:

$$R1 = \frac{M1}{N1 - M1}$$

In the illustrated embodiment shown in FIG. 5, the first disc 70 includes 13 teeth and the first ring gear 82 includes 14 teeth. Therefore, the first gear stage 58 provides a reduction ratio R1 of 13:1. In other words, the first disc 70 rotates about the bearing 134 to rotate the output member 66 about 27.7 degrees for every 360 degrees of rotation of the eccentric cam portion 130. Such an incremental angular rotation of the first disc 70 also correlates with the width of one of the teeth 86 of the first ring gear 82. In other embodiments, the first gear stage 58 may provide any other reduction ratio R1 as desired.

When the ring gears 82, 106 are in the second position (FIG. 7), the second gear stage 62 provides a reduction ratio R2 governed by the following equation:

$$R2 = \frac{M2}{N2 - M2}$$

In the illustrated embodiment shown in FIG. 7, the second disc 94 includes 47 teeth and the second ring gear 106 includes 48 teeth. Therefore, the second gear stage 62 provides a reduction ratio R2 of 47:1. In other words, the second disc 94 rotates about the bearing 138 to rotate the output member 66 about 7.7 degrees for every 360 degrees of rotation of the eccentric cam portion 130. Such an incremental angular rotation of the second disc 94 also correlates with the width of one of the teeth 110 of the second ring gear 106. In other embodiments, the second gear stage 62 may provide any other reduction ratio R2 as desired.

The clutch mechanism 46 will now be described with reference to FIG. 2. The clutch mechanism 46 includes a clutch housing 190 enclosing a drive plate 194 keyed to the spindle 34. A plurality of cam members 198 (e.g., rounded pins) are received within corresponding bores 202 of the drive plate 194 and engage the plurality of clutch dogs 154 on the output member 66 of the transmission assembly 42.

The power tool 10 also includes a torque adjustment mechanism 206 operable to allow a user of the power tool 10 to adjust the torque limit of the clutch mechanism 46. In the illustrated embodiment, the torque adjustment mechanism 206 includes a sleeve 210 that is rotatable with respect to the clutch housing 190 to adjust the amount of torque that the spindle 34 is capable of applying to a workpiece. The torque adjustment mechanism 206 also includes an adjusting ring 214 having a threaded outer periphery 218 that is engageable with a threaded inner periphery 222 of the sleeve 210, such that relative rotation between the sleeve 210 and the ring 214 imparts axial movement to the ring 214. A compression spring 226 is axially contained between the adjusting ring 214 and a spacer 230 abutting the cam members 198. Axial movement of the ring 214 adjusts the preload on the spring 226 and thereby increases or decreases the axial force exerted on the spacer 230 (and therefore, the cam members 198) by the spring 226.

During ordinary operation, the clutch dogs 154 on the output member 66 engage the cam members 198 to rotate the drive plate 194 and transmit torque to the spindle 34. If a reaction torque on the spindle 34 exceeds a predetermined threshold (depending upon the rotational position of the sleeve 210), the spindle 34 seizes, and the cam members 198 ride up and over the clutch dogs 154 on the output member 66, thereby compressing the spring 226. The spring 226 then rebounds in response to the cam members 198 descending on the clutch dogs 154. As discussed above, the preload on the spring 226 may be adjusted by rotating the sleeve 210 which, in turn, incrementally moves the adjusting ring 214 in accordance with numbers or values imprinted on the sleeve 210. The greater the preload on the spring 226, the more torque can be transferred to the spindle 34 before any slippage occurs between the output member 66 and the drive plate 194.

Operation of the multi-speed cycloidal transmission assembly 42 will now be discussed with respect to FIGS. 4-7.

FIG. 4 illustrates the transmission assembly 42 configured in a high-speed, low torque mode in which only the first cycloidal gear stage 58 is active. In this mode the first ring gear 82 is axially aligned with the first disc 70 such that rotation of the input shaft 54 causes the first disc 70 to eccentrically rotate or wobble about the inner circumferential surface 90 of the first ring gear 82. The offset holes 146 (FIG. 3) in the first disc 70 engage the pins 142 to rotate the output member 66. Because the second ring gear 106 is axially spaced from the second disc 94, the second disc 94 idles at a rotational speed equal to that of the first disc 70 due to the engagement of the pins 142 with the offset holes 150 in the second disc 94.

FIG. 6 illustrates the transmission assembly 42 configured in a low-speed, high torque mode in which only the second cycloidal gear stage 62 is active. To change to this mode, a user pivots the speed change lever 170 (e.g., by manipulating the sliding actuator 186 shown in FIG. 1), causing the ring gears 82, 106 to axially slide in the transmission housing 50 from the first position (FIG. 4) to the second position (FIG. 6). In this mode, the second ring gear 106 is axially aligned with the second disc 94 such that rotation of the input shaft 54 causes the second disc 94 to eccentrically rotate or wobble about the inner circumferential 114 surface of the second ring gear 106. The offset holes 150 in the second disc 94 engage the pins 142 to rotate the output member 66. Because the first ring gear 82 is axially spaced from the first disc 70, the first disc 70 idles at a rotational speed equal to that of the second disc 94 due to the engagement of the pins 142 with the offset holes 146 in the first disc 70.

Various features of the invention are set forth in the following claims.

What is claimed is:

1. A transmission assembly for operably coupling an input member to an output member, the transmission assembly comprising:
   a first cycloidal gear stage having a first gear ratio;
   a second cycloidal gear stage having a second gear ratio different than the first gear ratio; and
   a shifting mechanism for selectively driving the output member with one of the first cycloidal gear stage and the second cycloidal gear stage.

2. The transmission assembly of claim 1, wherein the first cycloidal gear stage includes a first ring gear having N teeth and a first disc having N−1 teeth.

3. The transmission assembly of claim 2, wherein the first ring gear has 14 teeth and the first disc has 13 teeth, such that the first gear ratio is 13:1.

4. The transmission assembly of claim 1, wherein the second cycloidal gear stage includes a second ring gear having N teeth and a second disc having N−1 teeth.

5. The transmission assembly of claim 4, wherein the second ring gear has 48 teeth and the second disc has 47 teeth, such that the second gear ratio is 47:1.

6. The transmission assembly of claim 1, wherein the first cycloidal gear stage includes a first ring gear and a first disc, wherein the second cycloidal gear stage includes a second ring gear and a second disc, and wherein the first ring gear and the second ring rear are axially movable relative to the first disc and the second disc, respectively.

7. The transmission assembly of claim 6, wherein the first ring gear and the second ring gear are interconnected and axially movable in unison relative to the first disc and the second disc, respectively.

8. The transmission assembly of claim 7, wherein the first ring gear and the second ring gear are axially displaceable between a first position, in which the first ring gear is engaged with the first disc such that the output member is driven with the first cycloidal gear stage, and a second position, in which the second ring gear is engaged with the second disc such that the output member is driven with the second cycloidal gear stage.

9. The transmission assembly of claim 8, wherein at least one of the first ring gear and the second ring gear includes a circumferential groove.

10. The transmission assembly of claim 9, wherein the shifting mechanism includes an actuator having a distal portion engaged with the circumferential groove for displacing the first ring gear and the second ring gear between the first position and the second position.

11. The transmission assembly of claim 8, wherein the first disc and the second disc are driven concurrently by the input member in both the first position and the second position.

12. The transmission assembly of claim 8, further comprising an eccentric cam disposed between the input member and the first and second discs for imparting eccentric motion to the first and second discs in response to rotation of the input member.

13. The transmission assembly of claim 12, wherein each of the first and second discs includes a plurality of holes, and wherein the transmission assembly further comprises a plurality of pins extending through the holes for imparting rotary motion to the output member.

14. A power tool comprising: a motor;
a spindle configured to be driven by the motor; and
a transmission assembly having an input member for receiving torque from the motor and an output member for transmitting torque to the spindle, the transmission assembly including
a first cycloidal gear stage having a first gear ratio;
a second cycloidal gear stage having a second gear ratio different than the first gear ratio; and
a shifting mechanism for selectively driving the output member with one of the first cycloidal gear stage and the second cycloidal gear stage.

15. The power tool of claim 14, wherein the first cycloidal gear stage includes a first ring gear having N teeth and a first disc having N−1 teeth.

16. The power tool of claim of claim 15, wherein the first ring gear has 14 teeth and the first disc has 13 teeth, such that the first gear ratio is 13:1.

17. The power tool of claim 14, wherein the second cycloidal gear stage includes a second ring gear having N teeth and a second disc having N−1 teeth.

18. The power tool of claim of claim 17, wherein the second ring gear has 48 teeth and the second disc has 47 teeth, such that the second gear ratio is 47:1.

19. The power tool of claim 14, wherein the first cycloidal gear stage includes a first ring gear and a first disc, wherein the second cycloidal gear stage includes a second ring gear and a second disc, and wherein the first ring gear and the second ring rear are axially movable relative to the first disc and the second disc, respectively.

20. The power tool of claim of claim 19, wherein the first ring gear and the second ring gear are interconnected and axially movable in unison relative to the first disc and the second disc, respectively.

21. The power tool of claim of claim 20, wherein the first ring gear and the second ring gear are axially displaceable between a first position, in which the first ring gear is engaged with the first disc such that the output member is driven with the first cycloidal gear stage, and a second position, in which the second ring gear is engaged with the second disc such that the output member is driven with the second cycloidal gear stage.

22. The power tool of claim of claim 21, wherein at least one of the first ring gear and the second ring gear includes a circumferential groove.

23. The power tool of claim of claim 22, wherein the shifting mechanism includes an actuator having a distal portion engaged with the circumferential groove for displacing the first ring gear and the second ring gear between the first position and the second position.

24. The power tool of claim of claim 21, wherein the first disc and the second disc are driven concurrently by the input member in both the first position and the second position.

25. The power tool of claim of claim 21, further comprising an eccentric cam disposed between the input member and the first and second discs for imparting eccentric motion to the first and second discs in response to rotation of the input member.

26. The power tool of claim of claim 25, wherein each of the first and second discs includes a plurality of holes, and wherein the transmission assembly further includes a plurality of pins extending through the holes for imparting rotary motion to the output member.

* * * * *